(12) United States Patent
Chen

(10) Patent No.: US 6,650,486 B2
(45) Date of Patent: Nov. 18, 2003

(54) LENS

(75) Inventor: Tien-Ching Chen, Taichung (TW)

(73) Assignee: Genius Electonic Optical (Xiamen) Co. Ltd., Fujian (CN)

( * ) Notice: Subject to any disclaimer, the term of this patent is extended or adjusted under 35 U.S.C. 154(b) by 6 days.

(21) Appl. No.: 10/098,480

(22) Filed: Mar. 18, 2002

(65) Prior Publication Data

US 2003/0142417 A1 Jul. 31, 2003

(30) Foreign Application Priority Data

Jan. 18, 2002 (CN) ........................................ 02218483 U

(51) Int. Cl.$^7$ ................................................. G02B 9/60
(52) U.S. Cl. ........................................ 359/770; 359/763
(58) Field of Search ................................ 359/757, 761, 359/763, 770

(56) References Cited

U.S. PATENT DOCUMENTS 3,936,153 A * 2/1976 Ogura ........................ 359/753
5,198,931 A * 3/1993 Igarashi ..................... 359/660

* cited by examiner

*Primary Examiner*—David N. Spector
(74) *Attorney, Agent, or Firm*—Browdy and Neimark, P.L.L.C.

(57) ABSTRACT

A lens assembly, which is mounted on a digital still camera (DSC), comprises a fixed aperture, and a lens unit. The lens unit has a first lens, a second lens, a third lens, a fourth lens and a fifth lens in sequence. The first lens is a biconcave lens disposed at the front side of the lens unit. The second lens is a biconvex lens. The third lens is a biconcave lens. The fourth lens is a positive meniscus lens. The fifth lens is a positive lens. The aperture is arranged between the first lens and the second lens.

3 Claims, 2 Drawing Sheets

LENS

FIELD OF THE INVENTION

The present invention relates to a camera lens for a camera of fixed focal length and, more specifically, to a lens assembly for use in a digital still camera or PC camera.

BACKGROUND OF THE INVENTION

Following fast development of personal computer technology, a variety of digital still cameras (DSC) have been disclosed for use with personal computers, and intensively used in families. A regular digital still camera uses a solid state image pickup device such as, charge-coupled device (CCD) or complementary metal-oxide semiconductor (CMOS), the image of an object, enabling the image thus obtained to be transferred through a data line to a personal computer, which uses a software program to convert the image into a JPEG, GIF, or TIFF file. In order to meet the tendency of the designing of digital still cameras toward microminiaturization, matching solid-state image pickup devices and related lenses are required to be as small as possible, i.e., the dimensions of the solid-state image pickup devices and the length of the lenses must be minimized. When minimizing the dimensions of a solid-state image pickup device, the overall length of the camera lens must be relatively shortened. According to conventional designs, a camera lens is comprised of a number of lenses axially aligned in a line, and an aperture arranged in between two of the lenses. Because the aperture is spaced between two lenses, the total distance of the camera lens cannot be shorted to the desired level. Furthermore, because a big number of lenses are used, the cost of the camera lens is high.

SUMMARY OF THE INVENTION

The present invention has been accomplished to provide a lens assembly, which has a simple structure and compact size. The arrangement of the lens unit greatly reduces the optical distortion, improving the image quality.

According to the primary objective as described above, the lens assembly comprises a fixed aperture, and a lens unit. The lens unit has a first lens, a second lens, a third lens, a fourth lens and a fifth lens in sequence. The first lens is a biconcave lens disposed at the front side of the lens unit. The second lens is a biconvex lens. The third lens is a biconcave lens. The fourth lens is a positive meniscus lens. The fifth lens is a positive lens having a surface, which has a larger curvature radius, facing the objective side. The first lens and the fourth lens are made of plastic having at least one of which having a non-spherical surface. The second lens, the third lens and the fifth lens are made of glass. The aperture is arranged between the first lens and the second lens.

The lens unit of the lens assembly has the conditions as described hereunder:

$$1.1 < -f1/f < 1.7 \tag{1}$$

$$1.1 < f5/f < 1.7 \tag{2}$$

Wherein, f1 is the focal length of the first lens, f5 is the focal length of the fifth lens and f is the total focal length of the lens unit.

The lens unit of the lens assembly has the conditions as described hereunder:

| | curvature radius (mm) | central thickness of lens/interval | index of refraction | Dispersion confident | diameter (mm) |
|---|---|---|---|---|---|
| objective | infinity | infinity | | | |
| R1 | −20.1037 | 0.86 | | | 3.985964 |
| R2 | 11.35668 | 0.48 | | | 3.364222 |
| aperture | infinity | 0.05 | | | 3.172465 |
| R3 | 4.72716 | 3.07 | 1.7725 | 49.62 | 3.50403 |
| R4 | −5.632884 | 0.75 | | | 3.7 |
| R5 | −5.665971 | 0.45 | 1.92286 | 20.88 | 3.647098 |
| R6 | 26.61596 | 1.64 | | | 3.877776 |
| R7 | −2.389224 | 1.42 | | | 4.141793 |
| R8 | −3.183525 | 0.05 | | | 5.798225 |
| R9 | 11.51578 | 1.7 | 1.8061 | 40.73 | 8.524591 |
| R10 | infinity | | | | 8.647865 |

DETAILED DESCRIPTION OF THE PREFERRED EMBODIMENT

Figure 1:
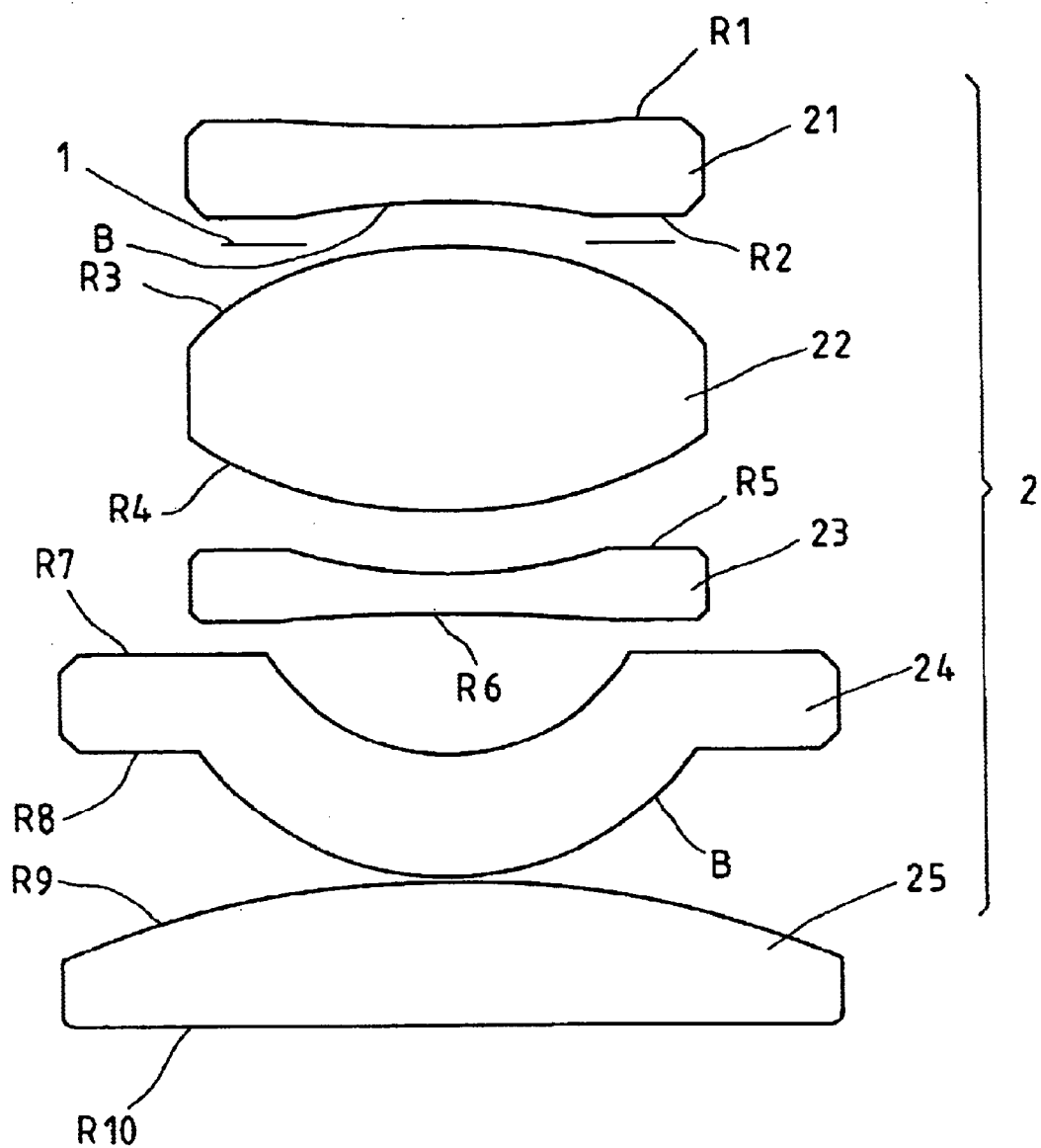
FIG. 1 is a schematic drawing, showing the arrangement of a lens assembly constructed of a first preferred embodiment of the present invention.

Referring to FIG. 1, a lens assembly of the preferred embodiment of the present invention is to be used in a digital still camera or the like, which comprises a fixed aperture 1, and a lens unit 2. The lens unit 2 has a first lens 21, a second lens 22, a third lens 23, a fourth lens 24 and a fifth lens 25 in sequence. The first lens 21 is a biconcave lens disposed at the front side of the lens unit 2. The second lens 22 is a biconvex lens. The third lens 23 is a biconcave lens. The fourth lens 24 is a positive meniscus lens. The fifth lens 25 is a positive lens with a surface of facing the objective side having a curvature radius R10 larger than the curvature radius R9 of the opposite surface. The first lens 21 and the fourth lens 24 are made of plastic having at least one of which having a non-spherical surface. The second lens 22, the third lens 23 and the fifth lens 25 are made of glass. The aperture 1 is arranged between the first lens 21 and the second lens 22.

Figure 2:
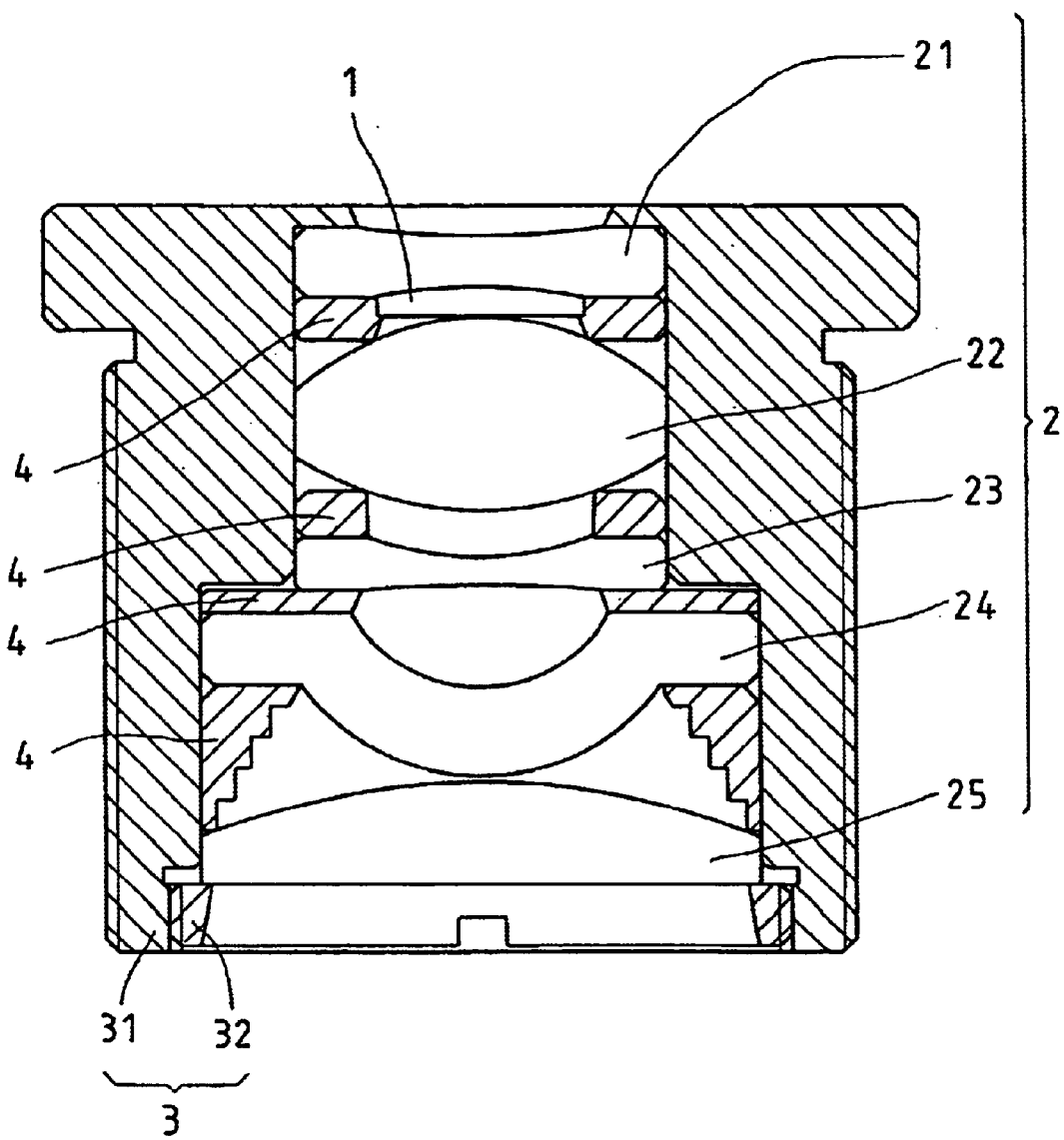
FIG. 2 is a schematic drawing, showing the lens assembly of the preferred embodiment of the present invention installed in a digital still camera.

Referring to FIG. 2, the lens assembly of the present invention is installed in the lens holder 3 of a digital still camera (not shown). The lens holder 3 has a cover 31 with a barrel 32 capped in the cover 31, and spacer 4 mounted inside the barrel 32 to hold the lens unit 2 in position. The first lens 21 and the fourth lens 24 have surfaces labeled B, which are non-spherical.

The lens 21 to 25 of the lens unit 1 constructed under the conditions as described hereunder:

$$1.1 < -f1/f < 1.7 \tag{1}$$

$$1.1 < f5/f < 1.7 \tag{2}$$

Wherein, f1 is the focal length of the first lens 21, f5 is the focal length of the fifth lens 22 and f is the total focal length of the lens unit 2.

Hereunder I will present the exact data of the lens assembly, wherein the focal length of the lens unit is 10 mm and the height of the image is 5.09 mm. The lens assembly of the present invention fits the conditions as shown in the table hereunder:

| curvature radius (mm) | central thickness of lens/interval | index of refraction | dispersion confident | diameter (mm) |
|---|---|---|---|---|
| objective infinity | infinity | | | |
| R1 −20.1037 | 0.86 | | | 3.985964 |
| R2 11.35668 | 0.48 | | | 3.364222 |
| aperture infinity | 0.05 | | | 3.172465 |
| R3 4.72716 | 3.07 | 1.7725 | 49.62 | 3.50403 |
| R4 −5.632884 | 0.75 | | | 3.7 |
| R5 −5.665971 | 0.45 | 1.92286 | 20.88 | 3.647098 |
| R6 26.61596 | 1.64 | | | 3.877776 |
| R7 −2.389224 | 1.42 | | | 4.141793 |
| R8 −3.183525 | 0.05 | | | 5.798225 |
| R9 11.51578 | 1.7 | 1.8061 | 40.73 | 8.524591 |
| R10 infinity | | | | 8.647865 |

The fifth lens 25 has a flat surface facing the image side, which can coat a film (not shown) thereon.

In conclusion, the arrangement of the lens assembly 10 greatly reduces the optical distortion, improving the image quality. When used with a CMOS type solid-state image pickup device, the camera cost can be greatly reduced. This design of lens assembly is suitable for use in small digital imaging products such as digital still cameras, and PC cameras.

What is claimed is:

1. A lens assembly, comprising an aperture, and a lens unit having a first lens, a second lens, a third lens, a fourth lens and a fifth lens in sequence, said first lens being a biconcave lens disposed at said front side of said lens unit, said second lens being a biconvex lens, said third lens being a biconcave lens, said fourth lens being a positive meniscus lens, said fifth lens being a positive lens with a surface of facing said objective side having a curvature radius larger than the curvature radius of the opposite surface; said first lens and said fourth lens being made of plastic having at least one of which having a non-spherical surface, said second lens, said third lens and said fifth lens being made of glass and said aperture being arranged between said first lens and said second lens.

2. The lens assembly as defined in claim 1, wherein said lens unit of said lens assembly has conditions as described hereunder:

$$1.1 < -f1/f < 1.7 \quad (1)$$

$$1.1 < f5/f < 1.7 \quad (2)$$

wherein f1 is the focal length of said first lens, f5 is the focal length of said fifth lens and f is the total focal length of said lens unit.

3. The lens assembly as defined in claim 1, wherein said lens assembly further has conditions as described hereunder:

| curvature radius (mm) | central thickness of lens/interval | index of refraction | dispersion confident | diameter (mm) |
|---|---|---|---|---|
| objective infinity | infinity | | | |
| R1 −20.1037 | 0.86 | | | 3.985964 |
| R2 11.35668 | 0.48 | | | 3.364222 |
| aperture infinity | 0.05 | | | 3.172465 |
| R3 4.72716 | 3.07 | 1.7725 | 49.62 | 3.50403 |
| R4 −5.632884 | 0.75 | | | 3.7 |
| R5 −5.665971 | 0.45 | 1.92286 | 20.88 | 3.647098 |
| R6 26.61596 | 1.64 | | | 3.877776 |
| R7 −2.389224 | 1.42 | | | 4.141793 |
| R8 −3.183525 | 0.05 | | | 5.798225 |
| R9 11.51578 | 1.7 | 1.8061 | 40.73 | 8.524591 |
| R10 infinity | | | | 8.647865 |

* * * * *